United States Patent
Ackley et al.

(10) Patent No.: US 8,463,079 B2
(45) Date of Patent: Jun. 11, 2013

(54) METHOD AND APPARATUS FOR GEOMETRICAL MEASUREMENT USING AN OPTICAL DEVICE SUCH AS A BARCODE AND/OR RFID SCANNER

(75) Inventors: H. Sprague Ackley, Seattle, WA (US); Christophe Lopez, Munich (DE)

(73) Assignee: Intermec IP Corp., Everett, WA (US)

( * ) Notice: Subject to any disclaimer, the term of this patent is extended or adjusted under 35 U.S.C. 154(b) by 663 days.

(21) Appl. No.: 12/638,616

(22) Filed: Dec. 15, 2009

(65) Prior Publication Data

US 2010/0220894 A1 Sep. 2, 2010

Related U.S. Application Data

(60) Provisional application No. 61/138,030, filed on Dec. 16, 2008.

(51) Int. Cl.
*G06K 9/20* (2006.01)
*G06K 7/10* (2006.01)

(52) U.S. Cl.
USPC ..................................... 382/312; 235/462.01

(58) Field of Classification Search
USPC ............. 382/106, 141, 312, 321; 235/462.01, 235/461, 462.46, 472.02, 470
See application file for complete search history.

(56) References Cited

U.S. PATENT DOCUMENTS

| | | | |
|---|---|---|---|
| 6,336,587 B1 * | 1/2002 | He et al. | 235/462.45 |
| 6,641,042 B1 * | 11/2003 | Pierenkemper et al. | 235/462.01 |
| 6,689,998 B1 * | 2/2004 | Bremer | 250/201.2 |
| 6,750,769 B1 * | 6/2004 | Smith | 340/572.1 |
| 7,554,449 B2 * | 6/2009 | Higham | 340/572.1 |
| 2003/0071118 A1 * | 4/2003 | Gershman et al. | 235/385 |
| 2005/0190098 A1 * | 9/2005 | Bridgelall et al. | 342/118 |
| 2006/0197652 A1 * | 9/2006 | Hild et al. | 340/10.2 |
| 2007/0184898 A1 * | 8/2007 | Miller et al. | 463/29 |

OTHER PUBLICATIONS

Vogt, H.; , "Multiple object identification with passive RFID tags," <I>Systems, Man and Cybernetics, 2002 IEEE International Conference on</I> , vol. 3, No., pp. 6 pp. vol. 3, Oct. 6-9, 2002.*

Hinske, Steve; , "Determining the Position and Orientation of Multi-Tagged Objects Using RFID Technology," Pervasive Computing and Communications Workshops, 2007.*

Hahnel, D.; Burgard, W.; Fox, D.; Fishkin, K.; Philipose, M.; , "Mapping and localization with RFID technology," Robotics and Automation, 2004. Proceedings. ICRA '04. 2004 IEEE International Conference on , vol. 1, No., pp. 1015-1020 vol. 1, Apr. 26-May 1, 2004.*

Boukraa et al, Tag-Based Vision: Assisting 3D Scene Analysis with Radio-Frequency Tags, International Conference on Image Processing 2002, 2002 pp. 269-272.*

* cited by examiner

*Primary Examiner* — Andrae S Allison
(74) *Attorney, Agent, or Firm* — Kinney & Lange, P.A.

(57) ABSTRACT

A system and method are described for determining the dimensions of items using an optical device, such as a barcode and/or RFID tag reader, for example. The dimensions of the field of view of the optical device are established, indexed by distance, and the dimensions of items in the field of view of the optical device are determined as a percentage of the full field of view of the optical device at the appropriate distance.

19 Claims, 3 Drawing Sheets

METHOD AND APPARATUS FOR GEOMETRICAL MEASUREMENT USING AN OPTICAL DEVICE SUCH AS A BARCODE AND/OR RFID SCANNER

CROSS-REFERENCE TO RELATED APPLICATION(S)

This application claims the benefit of U.S. Provisional Application No. 61/138,030 filed Dec. 16, 2008 for "Method and Apparatus for Geometrical Measurement Using an Optical Device such as a Barcode and/or RFID Scanner" by H. S. Ackley and C. Lopez.

INCORPORATION BY REFERENCE

The aforementioned U.S. Provisional Application No. 61/138,030 is hereby incorporated by reference in its entirety.

BACKGROUND

The present invention relates to a system and method for optically determining the dimensions and/or volumes of items.

For many applications, such as package delivery, it is desirable to quickly determine the dimensions of a container or item. In most cases, such as when boxes are being loaded onto a truck for transport and/or delivery, the dimensions of the containers or items are determined by a visual estimate or by measurement with a measuring tape before they are loaded.

Some systems employ a light curtain or photocell in combination with a conveyor to optically estimate the size of containers. In order for these systems to determine container sizes, a pre-measured item such as a ruler must be kept in the field of view so that the size of the container can be compared to the size of the pre-measured item in order to determine the container size, or optical techniques must be used to "build up" the dimensions of the container based on the known pixel size of the camera. These methods are either inconvenient (due to the use of external calibration) or error-prone (due to large errors caused by scaling up of pixels, for example).

In some particular applications, items may have the ability to transmit information by radio frequency identification (RFID) tags associated with each of the items. This is often a useful way to acquire information about items that are grouped together, such as on a pallet, without having to handle each individual item. However, in some cases, the RFID tags associated with the items do not all communicate successfully with an RFID tag reader being operated by handling personnel. In these situations, backup methods such as barcode reading and hand counting can be used to determine how many items are grouped together. However, these methods are labor intensive and inefficient.

An improved system for determining the size and number of items in various applications would be useful.

SUMMARY

A system and method are described herein for determining the dimensions of items using an optical device, such as a barcode and/or RFID tag reader, for example. The dimensions of the field of view of the optical device are established, indexed by distance, and the dimensions of items in the field of view of the optical device are determined as a percentage of the full field of view of the optical device at the appropriate distance.

DETAILED DESCRIPTION

Figure 1:
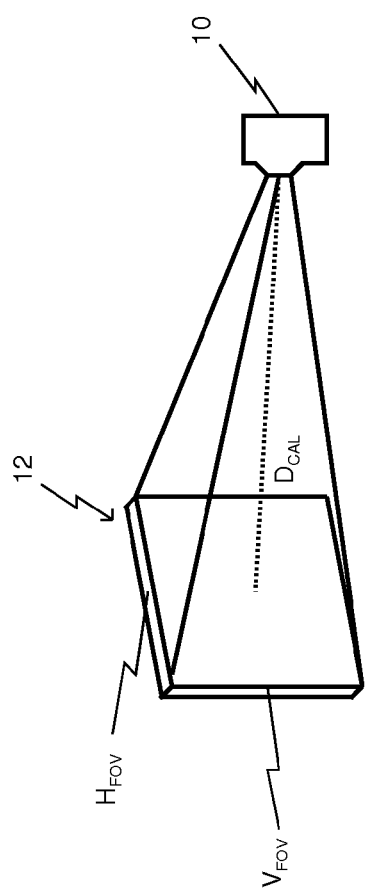
FIG. 1 is a diagram illustrating calibration of an optical device for use in an object dimensioning system and method according to an embodiment of the present invention.

FIG. 1 is a diagram illustrating calibration of optical device 10 for use in an object dimensioning system and method according to an embodiment of the present invention. Optical device 10 is a device or camera having two-dimensional imaging capability, such as a bar code reader or RFID tag reader in some embodiments. Optical device 10 also includes ranging capability to determine a distance from the camera to an object, utilizing laser triangulation or another known ranging method.

As shown in FIG. 1, calibration of the optical device 10 is performed by positioning optical device 10 a distance $D_{CAL}$ from a known reference item, such as reference wall 12. Optical device 10 is positioned so that the entire field of view of optical device 10 matches up with known dimensions on reference wall 12 (alternatively, calculational scaling may be performed to arrive at dimensions of the full field of view based on known dimensions that do not occupy the full field of view). These dimensions (shown in FIG. 1 as horizontal dimension $H_{FOV}$ and vertical dimension $V_{FOV}$) are stored in a calibration table, indexed by distance $D_{CAL}$, to provide information about the size of the full field of view of optical device 10 at a particular distance. Repeating this calibration procedure at different distances will populate the calibration table with field of view dimension information for a variety of distances.

Figure 2:
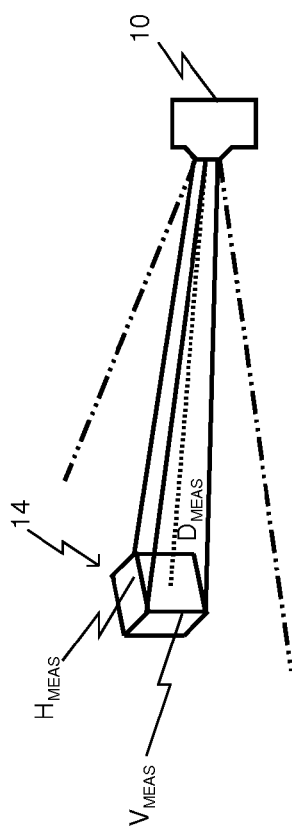
FIG. 2 is a diagram illustrating use of an optical device for measuring the dimensions of an object or space according to an embodiment of the present invention.

FIG. 2 is a diagram illustrating use of optical device 10 for measuring the dimensions of object 14 according to an embodiment of the present invention. Optical device 10 is manipulated by a user so that object 14 of interest is positioned in the field of view of optical device 10. Distance $D_{MEAS}$ is then determined, and information is retrieved from the calibration table corresponding to distance $D_{MEAS}$ to provide dimensions of the total field of view of optical device at distance $D_{MEAS}$. The dimensions of object 14 can then be determined by computing the percentage of the total field of view of optical device 10 that is occupied by object 14 in the horizontal and vertical directions, and multiplying that percentage by the stored dimensions for the total field of view from the calibration table to yield horizontal ($H_{MEAS}$) and vertical ($V_{MEAS}$) dimensions of object 14. The depth of object 14 can be computed using perspective geometry, in order to calculate the volume.

Figure 3A:
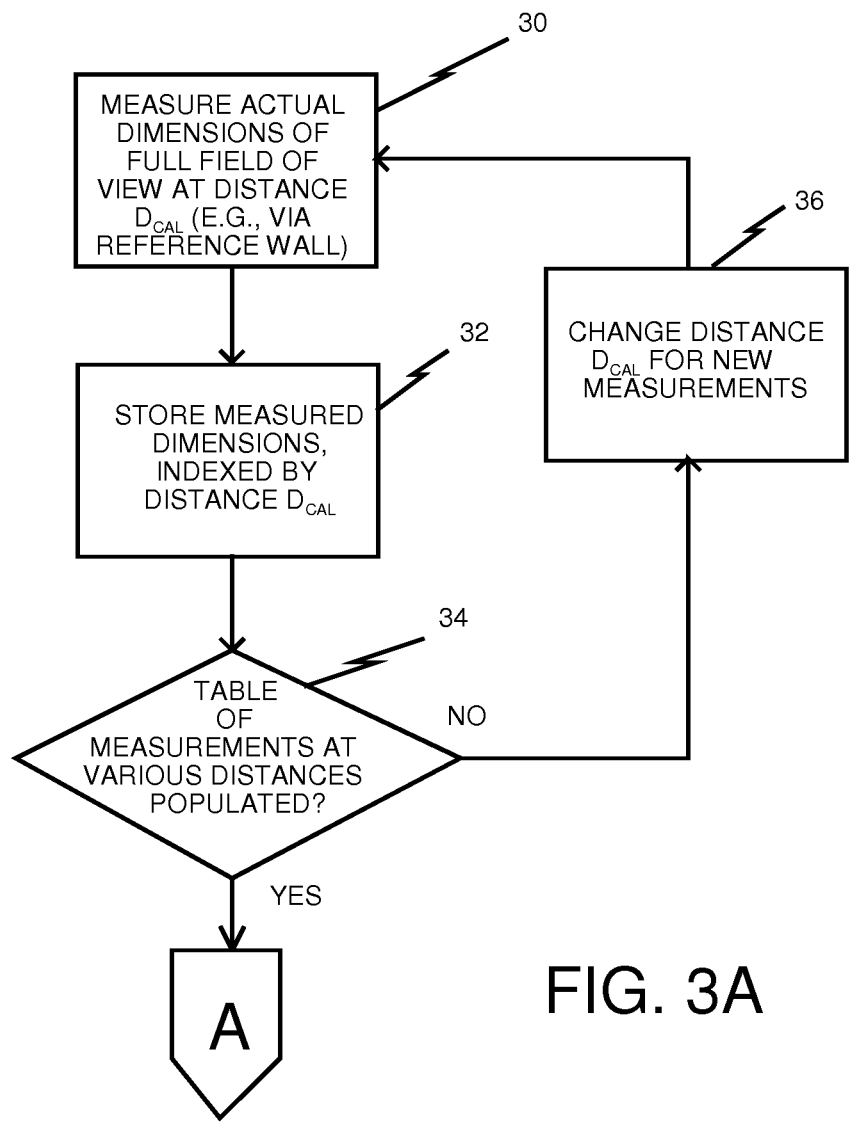
FIG. 3A is a flow diagram illustrating a method of calibrating an optical device for use in a dimensioning system and method according to an embodiment of the present invention.

FIG. 3A is a flow diagram illustrating a method of calibrating optical device 10 (FIG. 1) for use in a dimensioning system and method according to an embodiment of the present invention, as generally described above with respect to FIG. 1. Initially, the full field of view of the optical device is measured at distance $D_{CAL}$ (step 30), such as by use of a reference wall or some other object of known dimensions.

The measured dimensions of the full field of view are then stored, indexed by the distance $D_{CAL}$ (step 32). At decision step 34, it is then determined whether the table of measurements at various distances is sufficiently populated. If the table is not yet sufficiently populated, the distance $D_{CAL}$ from the optical device to an object with known dimensions is changed (step 36), and the process is repeated for the new distance $D_{CAL}$. Once the table of measurements is sufficiently populated, the calibration process is complete, and the optical device may be used to measure the dimensions of objects of interest, as indicated by box A.

Figure 3B:
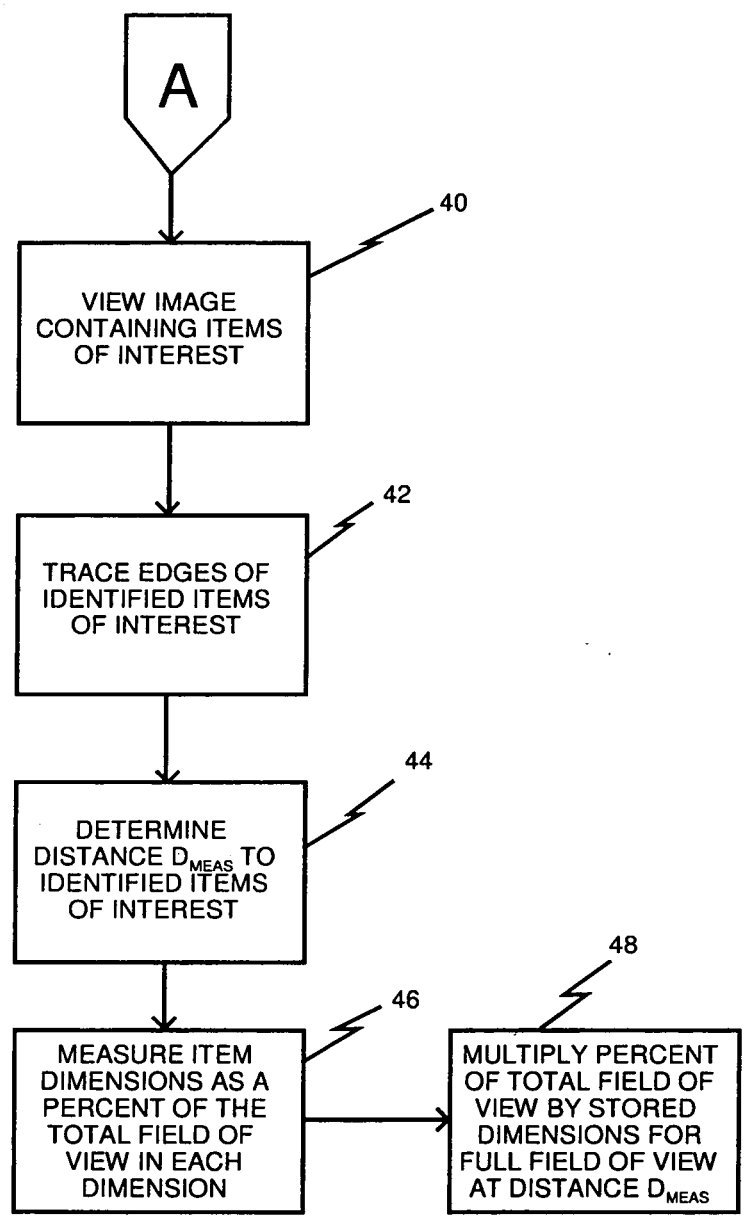
FIG. 3B is a flow diagram illustrating a method of using an optical device to measure the dimensions of an object or space of interest according to an embodiment of the present invention.

FIG. 3B is a flow diagram illustrating a method of using optical device 10 (FIG. 2) to measure the dimensions of an object of interest according to an embodiment of the present invention, as generally described above with respect to FIG. 2. The optical device can be used for measurements after calibration has been completed, as indicated by box A. The optical device is then positioned to view an image containing one or more items/objects of interest (step 40). The edges of the identified items/objects of interest are then traced (step 42), such as by appropriate computer software operatively coupled with the optical device that identifies the edges of objects in the image. The distance $D_{MEAS}$ from the optical device to the identified items/objects of interest is determined (step 44), by a range finding method such as laser triangulation or sonic reflection, for example, or another suitable method. The item/object dimensions are measured as a percentage of the total field of view of the optical device in each dimension (step 46), and this percentage is multiplied by the dimensions of the total field of view stored in the calibration table associated with the optical device, indexed by distance $D_{MEAS}$ (step 48).

The dimensioning system and method of the present invention may involve a variety of different calculations and outputs. In a first embodiment, the output of the system may be dimensions of individual items or objects of interest in the field of view of the optical device. In a second embodiment, the output of the system may be an empty volume in the field of view, determined by subtracting the dimensions of objects in the field of view from the dimensions of the total field of view of the optical device. In a third embodiment, the optical device may be used with an RFID reader to estimate the number of RFID tags that were not read or to reject RFID tags that were read that were too far away. In this embodiment, rather than determining the dimensions of an individual object, a group of objects is measured and compared to known object types (such as washing machine boxes, for example), in order to determine the number of boxes on a pallet or otherwise grouped together. This number can then be compared to the number of RFID tags that were read, to determine whether the number of tags read corresponds to the number of objects present.

In an exemplary embodiment, optical device 10 described above is a barcode reader and/or RFID tag reader. One useful aspect of the present invention is that the same equipment used by personnel that is handling objects for sorting, loading, and/or delivery can be used to provide the additional functionality of determining object dimensions as described above. The optics associated with the barcode/RFID system that is capable of decoding one-dimensional and two-dimensional bar code symbols are sufficient for dimensioning to be performed, simply by providing software (implemented with a processor and memory) operatively coupled to the optics that allows a calibration table to be populated and that provides the capability to perform edge tracing and calculation of the percentage of the field of view occupied by one or more objects. As a result, the ability of sorting/loading/delivery personnel to work effectively with items/object is enhanced.

Although the present invention has been described with reference to preferred embodiments, workers skilled in the art will recognize that changes may be made in form and detail without departing from the spirit and scope of the invention.

In view of the foregoing, the present invention includes at least the following aspects and features.

A system is provided for dimensioning items or spaces, including:
   an optical device,
   a range finding capability associated with the optical device, and
   a processor and a memory associated with the optical device, where the memory stores calibration information related to the dimensions of the full field of view of the optical device for a given distance to an object,
   where the optical device is operable to acquire an image of the item or space to be dimensioned, and to communicate with the processor so that the processor computes the dimension of the item or space using the range finding capability and the calibration information.

A method is provided for dimensioning items or spaces, including:
   establishing calibration information for the size of the field of view of an optical device at various distances
   determining the distance from the optical device to an item or space to be dimensioned,
   capturing an image of the item or space with the optical device, and
   computing the dimensions of the item or space based on the percentage of the field of view of occupied by the item or space and the calibration information for the distance from the optical device to the item or space being dimensioned.

In some embodiments, the optical device is a barcode and/or RFID tag scanner.

According to another aspect, a system is provided for reading RFID tags including:
   an optical device,
   a device providing range-finding capability,
   an RFID interrogator, and
   a processor and a memory,
   wherein the optical device provides an image of an item or space and the processor computes the dimensions of the item or space, and relates the RFID tag data to the item or space dimensions.

Other aspects of the invention are apparent in view of the foregoing description and drawings.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A system for dimensioning items or spaces, comprising:
   a two-dimensional imaging optical device having range finding capability; and
   a processor and a memory associated with the optical device, wherein the memory stores calibration informa- tion related to dimensions of a full field of view of the optical device for a given distance to an object;

wherein the optical device is operable to acquire an image of the item or space to be dimensioned, and to communicate with the processor so that the processor computes the dimensions of the item or space using the range finding capability and the calibration information.

2. The system of claim 1, wherein the optical device is a barcode and/or RFID tag scanner.

3. The system of claim 1, wherein the processor and the memory associated with the optical device include edge tracing software operatively coupled with the optical device that identifies edges of objects in the image acquired by the optical device.

4. The system of claim 1, wherein the range finding capability of the optical device comprises laser triangulation or sonic reflection.

5. The system of claim 1, wherein the processor computes the dimensions of the item or space by determining the distance to the item or space, measuring a percentage of the total field of view occupied by the item or space, and multiplying the percentage by the dimensions of the full field of view for the determined distance to the item or space stored in the calibration information.

6. The system of claim 1, wherein the processor computes the dimensions of an empty region in the field of view of the optical device, by determining the distance to the empty region, measuring a percentage of the total field of view occupied by objects in the field of view, multiplying the percentage by the dimensions of the full field of view for the determined distance to the empty region stored in the calibration information, and subtracting the computed dimensions of the objects from the dimensions of the full field of view for the determined distance.

7. A method of dimensioning an item or space, comprising:
aiming a two-dimensional imaging optical device toward the item or space to be dimensioned such that the item or space is in the field of view of the optical device;
determining a distance from the optical device to the item or space to be dimensioned;
capturing an image of the item or space with the optical device; and
computing the dimensions of the item or space based on the relative field of view occupied by the item or space and stored calibration information for the distance from the optical device to the item or space being dimensioned.

8. The method of claim 7, further comprising:
establishing the calibration information for dimensions of the total field of view of the optical device at various distances;
wherein computing the dimensions of the item or space is based on a percentage of the total field of view of the optical device occupied by the item or space and the calibration information for the distance from the optical device to the item or space being dimensioned.

9. The method of claim 8, wherein establishing the calibration information for the dimensions of the total field of view of the optical device at various distances comprises:
positioning the optical device at a fixed distance from a reference item having known dimensions, such that the total field of view of the optical device matches up with the known dimensions of the reference item;
storing the known dimensions of the reference item in a calibration table, indexed by the fixed distance value, to provide information about the dimensions of the total field of view of the optical device at the fixed distance; and
repeating the steps of positioning and storing for further fixed distances.

10. The method of claim 9, wherein the reference item comprises markings on a reference wall.

11. The method of claim 8, wherein establishing calibration information for the dimensions of the total field of view of the optical device at various distances comprises:
positioning the optical device at a fixed distance from a reference item having known dimensions, such that a known portion of the field of view of the optical device matches up with the known dimensions of the reference item;
performing calculational scaling to determine the dimensions represented by the total field of view at the fixed distance based on the known dimensions of the reference item and the known portion of the field of view of the optical device matched up with the reference item;
storing the dimensions represented by the total field of view in a calibration table, indexed by the fixed distance value, to provide information about the size of the total field of view of the optical device at the fixed distance; and
repeating the steps of positioning, performing calculational scaling, and storing for further fixed distances.

12. The method of claim 11, wherein the reference item comprises markings on a reference wall.

13. The method of claim 8, wherein computing the dimensions of the item or space comprises measuring a percentage of the total field of view occupied by the item or space, and multiplying the percentage by the dimensions of the total field of view for the determined distance to the item or space stored in the calibration information.

14. The method of claim 8, wherein computing the dimensions of the item or space comprises computing the dimensions of an empty region in the field of view of the optical device by measuring a percentage of the total field of view occupied by objects in the field of view, multiplying the percentage by the dimensions of the full field of view for the determined distance to the objects stored in the calibration information, and subtracting the computed dimensions of the objects from the dimensions of the full field of view for the determined distance.

15. The method of claim 7, wherein the optical device is a barcode and/or RFID tag scanner.

16. A system for reading RFID tags, comprising:
a two-dimensional imaging optical device that provides an image of an item or space;
a range-finding component that determines a distance from the optical device to the item or space;
an RFID interrogator that reads RFID tag data; and
a processor and a memory, the processor being operable to compute dimensions of the item or space based on the image of the item or space and the distance from the optical device to the item or space, and to relate the RFID tag data to the dimensions of the item or space.

17. The system of claim 16, wherein the processor is operable to:
compute total dimensions of a group of objects in a field of view of the optical device;
compare the total dimensions of the group of objects to known individual dimensions of objects in the group, to determine how many objects are present in the group; and
analyze the RFID tag data read by the RFID interrogator to compare the number of RFID tags read by the RFID interrogator to the number of objects present in the group.

18. The system of claim 17, wherein analyzing the RFID tag data read by the RFID interrogator to compare the number of RFID tags read by the RFID interrogator to the number of objects present in the group comprises determining the number of RFID tags that were not read.

19. The system of claim 17, wherein analyzing the RFID tag data read by the RFID interrogator to compare the number of RFID tags read by the RFID interrogator to the number of objects present in the group comprises determining the number of RFID tags that were read that do not belong to the group.

* * * * *